(12) United States Patent
Proctor et al.

(10) Patent No.: US 6,722,137 B2
(45) Date of Patent: Apr. 20, 2004

(54) METHODS AND APPARATUS FOR REGULATING TURBINE CLEARANCE CONTROL SYSTEM AIRFLOW

(75) Inventors: Robert Proctor, West Chester, OH (US); John William Hanify, West Chester, OH (US); Debra Lynn Prikkel, Dayton, OH (US); Michael Jay Epstein, Mason, OH (US); Julius John Montgomery, Mason, OH (US)

(73) Assignee: General Electric Co., Schenectady, NY (US)

(*) Notice: Subject to any disclaimer, the term of this patent is extended or adjusted under 35 U.S.C. 154(b) by 239 days.

(21) Appl. No.: 09/932,596

(22) Filed: Aug. 17, 2001

(65) Prior Publication Data

US 2003/0034474 A1 Feb. 20, 2003

(51) Int. Cl.$^7$ .................................................. F16K 1/22
(52) U.S. Cl. ........................... 60/782; 60/785; 251/305; 415/178; 123/337
(58) Field of Search ............................ 251/305, 306, 251/308; 415/178; 123/337; 60/782, 785

(56) References Cited

U.S. PATENT DOCUMENTS

| | | | |
|---|---|---|---|
| 3,059,897 A | * 10/1962 | Jensen ........................ 251/308 |
| 3,620,242 A | * 11/1971 | Morris ........................ 251/306 |
| 3,627,261 A | * 12/1971 | Ludeman .................... 251/305 |
| 3,770,242 A | * 11/1973 | O'Connor, Jr. ............. 251/305 |
| 4,022,424 A | 5/1977 | Davis et al. |
| 4,111,395 A | 9/1978 | Sheppard |
| 4,154,426 A | 5/1979 | Santy et al. |
| 4,213,595 A | 7/1980 | Sheppard |
| 4,248,051 A | 2/1981 | Darcy et al. |
| 4,266,753 A | * 5/1981 | Okada ........................ 251/305 |
| 4,411,405 A | 10/1983 | Barbe |
| 4,489,917 A | * 12/1984 | Baumann ..................... 251/305 |
| 4,921,212 A | 5/1990 | deQuay |
| 5,063,963 A | 11/1991 | Smith |
| 5,151,022 A | 9/1992 | Emerson et al. |
| 5,160,118 A | * 11/1992 | Stary ........................... 251/305 |
| 5,326,077 A | 7/1994 | Spencer et al. |
| 5,327,720 A | 7/1994 | Train |
| 5,327,744 A | 7/1994 | Frawley et al. |
| 5,664,760 A | * 9/1997 | Army et al. ................. 251/305 |
| 5,685,520 A | 11/1997 | Velan |
| 5,743,512 A | * 4/1998 | Greenberg .................. 251/308 |
| 5,860,283 A | 1/1999 | Coleman et al. |
| 6,138,988 A | 10/2000 | Bouvet et al. |
| 6,338,468 B1 | * 1/2002 | Ogawa et al. .............. 251/305 |
| 6,412,752 B1 | * 7/2002 | Daly et al. .................. 123/337 |
| 6,481,210 B1 | 11/2002 | Chapman |

* cited by examiner

Primary Examiner—John Bastianelli
(74) Attorney, Agent, or Firm—Nathan D. Herkamp; Armstrong Teasdale LLP; Robert B. Reeser, III

(57) ABSTRACT

A butterfly valve for a gas turbine engine includes a valve shaft and a valve disk. The valve disk has a centerline axis that extends through the valve disk. The valve disk also includes a shaft opening, an outer periphery, an outer surface, a first side, and a second side. The first side is opposite the second side. The shaft opening extends through the valve disk adjacent the centerline axis, and is sized to receive the valve shaft therein. The disk outer surface extends over the first and second sides, and is tapered between the outer periphery and the centerline axis over at least one of the disk first and second sides.

20 Claims, 4 Drawing Sheets

METHODS AND APPARATUS FOR REGULATING TURBINE CLEARANCE CONTROL SYSTEM AIRFLOW

BACKGROUND OF THE INVENTION

This invention relates generally to gas turbine engines and more particularly, to butterfly valve assemblies used to regulate fluid flow to a gas turbine engine.

Gas turbine engines typically include an engine casing that extends circumferentially around a compressor, and a turbine including a rotor assembly and a stator assembly. The rotor assembly includes at least one row of rotating blades that extend radially outward from a blade root to a blade tip. A circumferential tip clearance is defined between the rotating blade tips and the engine casing.

During engine operation, heat generated by the engine may cause thermal expansion of the stator assemblies, and render the tip clearance non-uniform circumferentially. As a result, inadvertent rubbing between the rotor blade tips and the engine casing may occur. Continued rubbing between the rotor blade tips and engine casing may lead to premature failure of the rotor blade or loss of engine performance.

To facilitate optimizing engine performance and to minimize inadvertent rubbing between the rotor blade tips and the engine casing, at least some known engines include a clearance control system. The clearance control system supplies cooling air to the engine casing to control thermal growth of the engine casing to facilitate minimizing inadvertent blade tip rubbing. Because the engine casing should be thermally cooled circumferentially, the clearance control systems include a plurality of complex duct work and associated valves coupled circumferentially around the engine.

To facilitate controlling the airflow supplied through the duct work, at least some known clearance control systems include butterfly valves. Each valve assembly includes a valve body, a valve shaft, and a valve disk. The valve body is coupled to the ductwork, and the valve shaft extends through an opening in the disk to pivotally couple the valve disk to the body for controlling the fluid flow. To enable the valve disk to seat circumferentially against the valve body to stop fluid flow through the valve body, the shaft extends obliquely through the valve disk. More specifically, the disk is substantially flat and includes raised areas that extend outwardly from the flat portions of the disk to define a portion of the shaft opening.

During engine operation, the transition from the substantially flat areas of the disk to the raised areas creates an abrupt inlet contraction and an abrupt exit expansion that may facilitate increasing loss coefficients associated with the fluid flowing through the valve. The increased loss coefficients facilitate reducing the pressure of the fluid flowing through the valve. As a result, fluid is discharged from the butterfly valve at a reduced pressure in comparison to the pressure of the fluid entering the valve. The raised areas also reduce an effective flow area through the butterfly valve. Such pressure losses may reduce the effectiveness of the clearance control system.

BRIEF SUMMARY OF THE INVENTION

In one aspect, a butterfly valve is provided. The butterfly valve includes a valve shaft and a valve disk. The valve disk has a centerline axis that extends through the valve disk. The valve disk also includes a shaft opening, an outer periphery, an outer surface, a first side, and a second side. The first side is opposite the second side. The shaft opening extends through the valve disk adjacent the centerline axis, and is sized to receive the valve shaft therein. The disk outer surface extends over the first and second sides, and is tapered between the outer periphery and the centerline axis over at least one of the disk first and second sides.

In another aspect, a method for operating a gas turbine engine is provided. The method includes directing airflow into an air supply pipe through a butterfly valve assembly that includes a valve disk that has opposed sides, an outer periphery, and an outer surface that extends over both sides and is tapered from the disk outer periphery to a centerline axis that extends through the valve disk, and channeling the air flowing through the air supply pipe to an engine clearance control system.

In a further aspect, a gas turbine engine clearance control system is provided. The clearance control system includes an air supply pipe and a butterfly valve that is configured to regulate an amount of airflow entering the air supply pipe. The butterfly valve includes a valve shaft and a valve disk. The valve disk has a centerline axis that extends through the valve disk. The valve disk includes an opening extending therethrough, an outer periphery, an outer surface, and a pair of opposing sides. The opening extends along the valve disk centerline axis, and the shaft extends through the opening. The outer surface extends over the disk sides and is tapered between the outer periphery and the centerline axis.

DETAILED DESCRIPTION OF THE INVENTION

Figure 1:
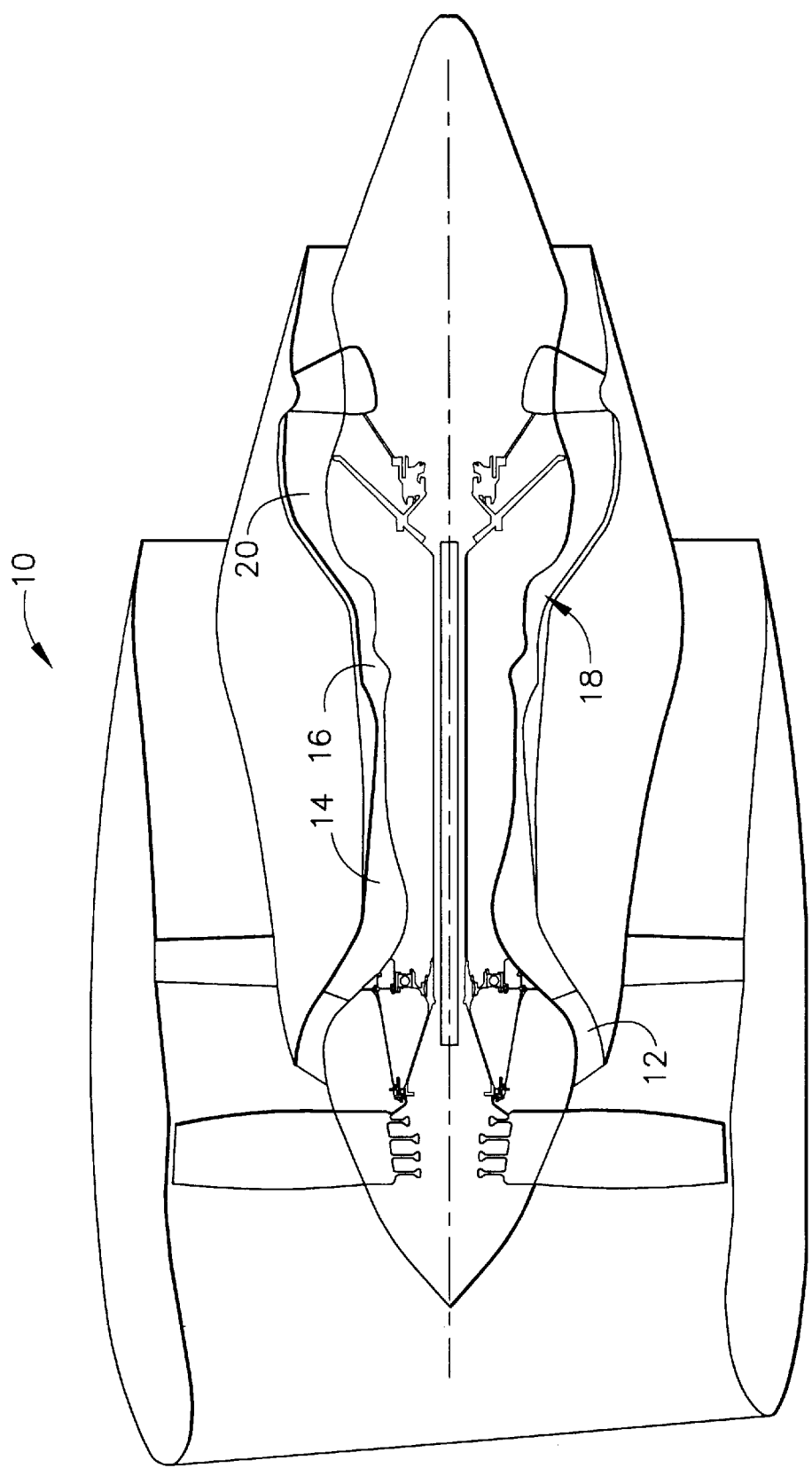
FIG. 1 is a schematic illustration of a gas turbine engine.

FIG. 1 is a schematic illustration of a gas turbine engine 10 including a fan assembly 12, a compressor 14, and a combustor 16. In one embodiment, compressor 14 is a high-pressure compressor. Engine 10 also includes a high-pressure turbine 18, and a low-pressure turbine 20. In one embodiment, engine 10 is a CFM 56 engine commercially available from General Electric Company, Cincinnati, Ohio.

In operation, air flows through fan assembly 12 and compressed air is supplied to compressor 14. The compressed air is delivered to combustor 16. Airflow from combustor 16 drives turbines 18 and 20, and turbine 20 drives fan assembly 12.

Figure 2:
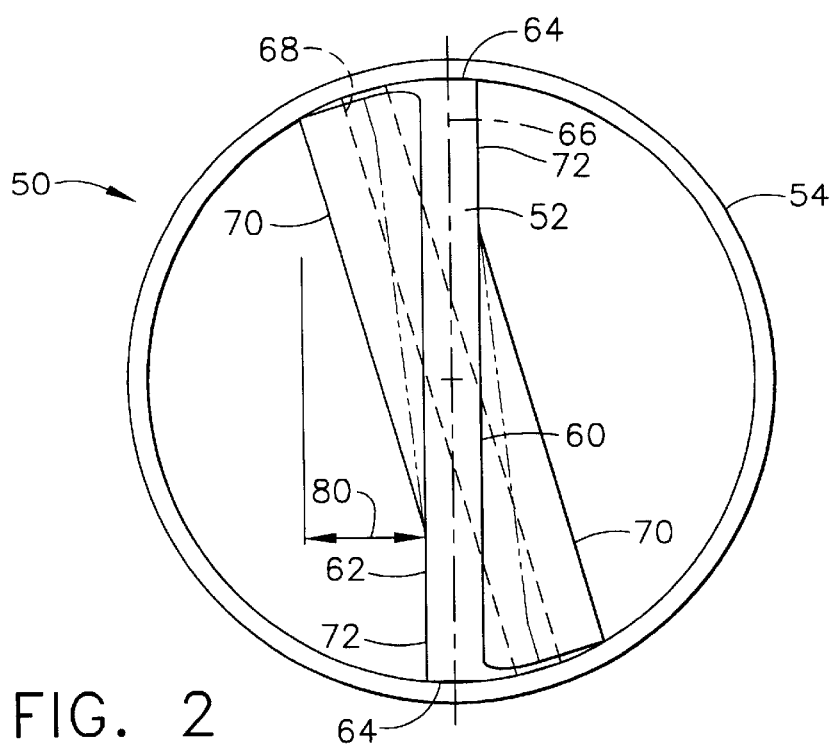
FIG. 2 is a front view of a known butterfly valve assembly.
Figure 3:
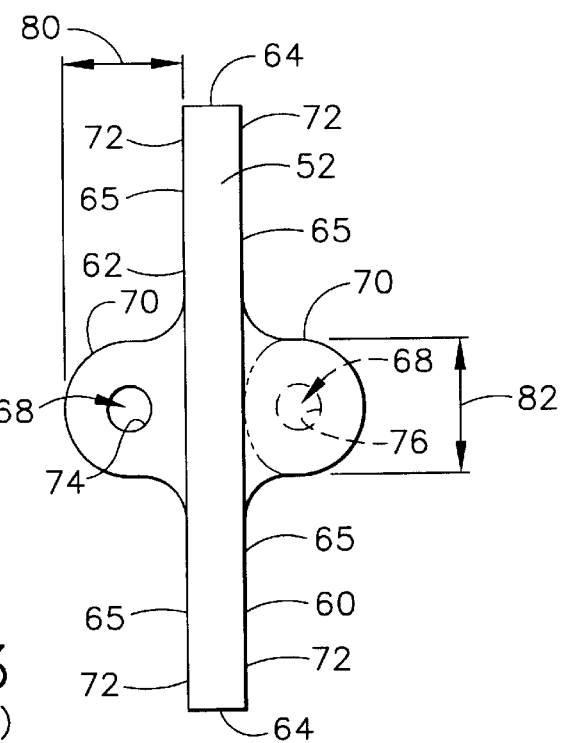
FIG. 3 is a plan view of the valve disk shown in FIG. 2.

FIG. 2 is a front view of a known butterfly valve assembly 50 including a valve disk 52, a valve body 54, and a valve shaft (not shown). FIG. 3 is a plan cross-sectional view of valve disk 52. Butterfly valve assembly 50 is used to control flow to a supply pipe (not shown in FIGS. 2 and 3). In one embodiment, butterfly valve assembly 50 is used to regulate airflow to a gas turbine engine clearance control system.

Valve disk 52 is substantially circular and includes a front side 60, an opposing rear side 62, and an outer periphery 64. In one embodiment, a groove (not shown) circumscribing outer periphery 64 receives a seal (not shown) therein for sealing valve disk 52 circumferentially against valve body 54. Valve disk 52 is known as a flat plate design because disk sides 62 and 60 include substantially planar areas 65. Valve disk 52 includes a centerline axis 66 extending therethrough, and a shaft bore 68 that extends therethrough and is sized to receive the valve shaft therein. More specifically, the valve shaft extends through valve shaft bore 68 and pivotally couples valve disk 52 to valve body 54.

Each valve disk side 60 and 62 defines a portion of shaft bore 68. More specifically, bore 68 is not concentrically aligned with respect to valve disk centerline axis 66, but rather extends obliquely through valve disk 52 with respect to centerline axis 66. Accordingly, each side 60 and 62 includes a raised area 70 that extends outwardly from an outer surface 72 of disk 52 to define a respective entrance and exit opening 74 and 76 for shaft bore 68. More specifically, each area 70 defines a semi-circular cross-sectional profile extending from planar areas 65. Adjacent outer periphery 64, each frusto-conical area 70 extends outwardly a maximum distance 80 adjacent outer periphery 64. Furthermore, because areas 70 each have a width 82 that is only slightly larger than a width (not shown) of the valve shaft, areas 70 do not extend to outer periphery 64.

When butterfly valve assembly 50 is in a fully-opened position, as shown in FIG. 2, valve disk 52 has a front cross-sectional blockage profile that obstructs a portion of the fluid path through valve body 54. A ratio of the interior cross-sectional area of valve body 54 to the valve disk front cross-sectional blockage profile is a design parameter that is defined as an effective area of the butterfly valve assembly. In one embodiment, butterfly valve assembly 52 has an effective area that is approximately equal 1.85 in$^2$.

During use, as fluid flows towards butterfly valve assembly 50, the front cross-sectional blockage profile of valve disk 52 reduces a static and a total pressure of the fluid passing through butterfly valve assembly 50. Furthermore, the transition between valve disk planar areas 65 and raised areas 70 creates an abrupt inlet contraction and abrupt exit expansion for fluid passing through butterfly valve assembly 50. Such contraction and expansion facilitates increasing loss coefficients of the fluid, thus further reducing the total pressure of the fluid.

Figure 4:
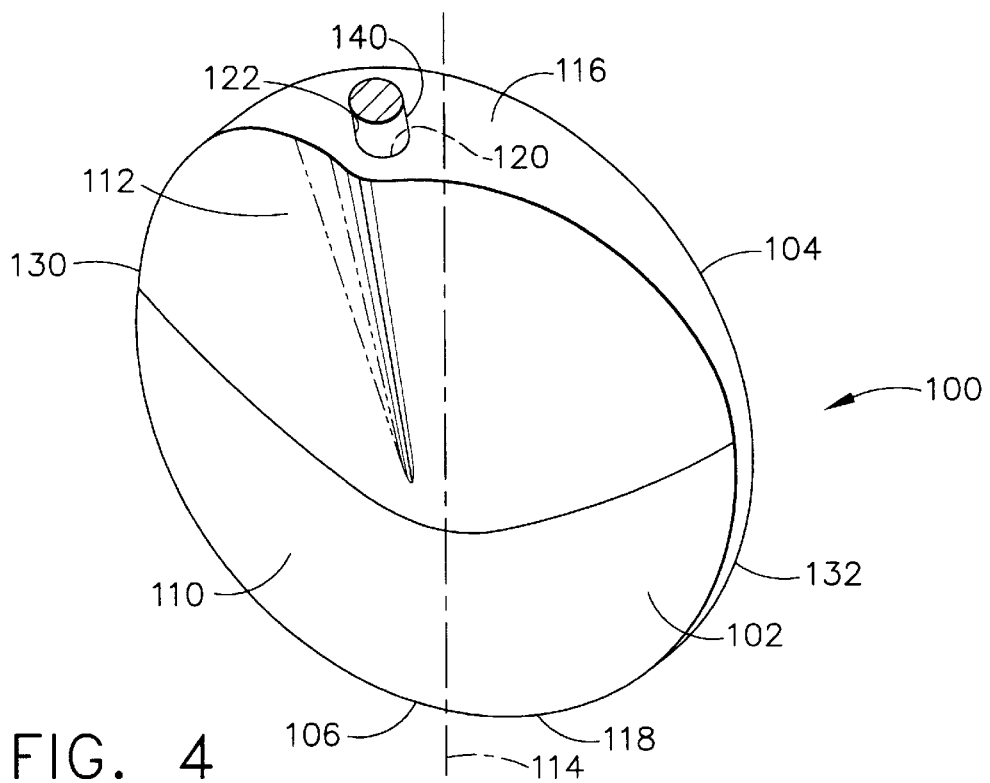
FIG. 4 is a perspective view of a valve disk for a butterfly valve assembly that may be used with the engine shown in FIG. 1.
Figure 5:
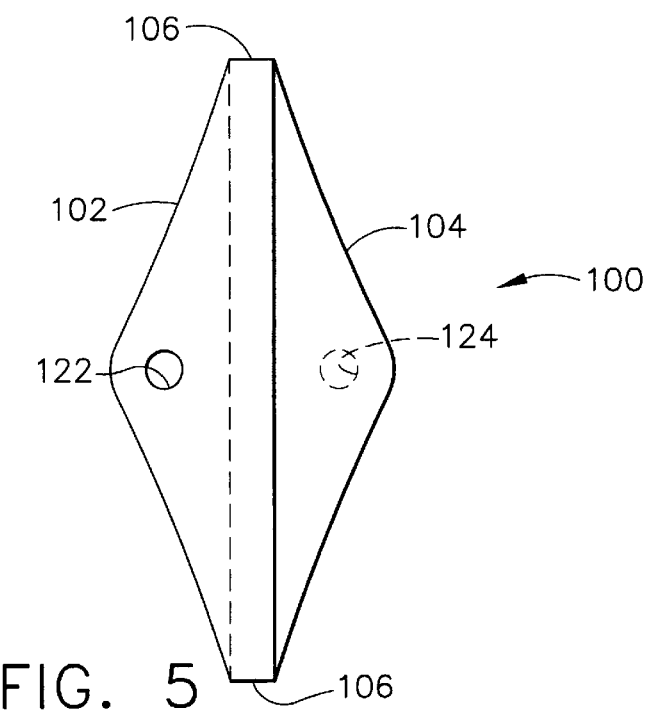
FIG. 5 is a cross-sectional view of the valve disk shown in FIG. 4.

FIG. 4 is a perspective view of a valve disk 100 for a butterfly valve assembly (not shown in FIGS. 4 and 5) that may be used to regulate fluid flows on a gas turbine engine, such as engine 10 (shown in FIG. 1). FIG. 5 is a cross-sectional view of valve disk 100. Valve disk 100 is substantially circular and includes a front side 102, an opposing rear side 104, and an outer periphery 106. In one embodiment, outer periphery 106 includes a groove (not shown) sized to receive a seal (not shown). Valve disk sides 102 and 104 are substantially similar and each includes a substantially planar area 110 and a raised area 112. Valve disk 100 also has a centerline axis 114 that extends therethrough from a top side 116 of valve disk 100 to a bottom side 118 of valve disk 100.

Valve disk 100 also includes a shaft bore 120 that extends therethrough. Shaft bore 120 is sized to receive a valve shaft (not shown in FIGS. 4 and 5). More specifically, the valve shaft extends from valve disk top side 116 to valve disk bottom side 118 and pivotally couples valve disk 100 to a butterfly valve body (not shown in FIGS. 4 and 5).

Shaft bore 120 is not concentrically aligned with respect to valve disk centerline axis 114, but rather shaft bore 120 extends obliquely through valve disk 100 with respect to axis 114. Accordingly, raised areas 112 of each disk side 102 and 104 define a respective entrance and exit opening 122 and 124 of shaft bore 120. Raised areas 112 extend over approximately half of each disk side 102 and 104. More specifically, disk front side raised area 112 extends substantially over a top half of disk front side 102, and disk rear side raised area 112 extends substantially over a bottom half of disk rear side 104.

Each disk raised area 112 extends from disk centerline axis 114 to disk outer periphery 106. More specifically, each disk raised area 112 is aerodynamically-shaped, and gradually taper from above shaft bore 120 outwardly to disk outer periphery 106. Because each raised area 112 extends over approximately half of each disk side 102 and 104, raised areas define a substantially parallelogram-shaped cross-sectional profile for valve disk 100 that is streamlined. In one embodiment, raised areas 112 are slightly concave.

Figure 6:
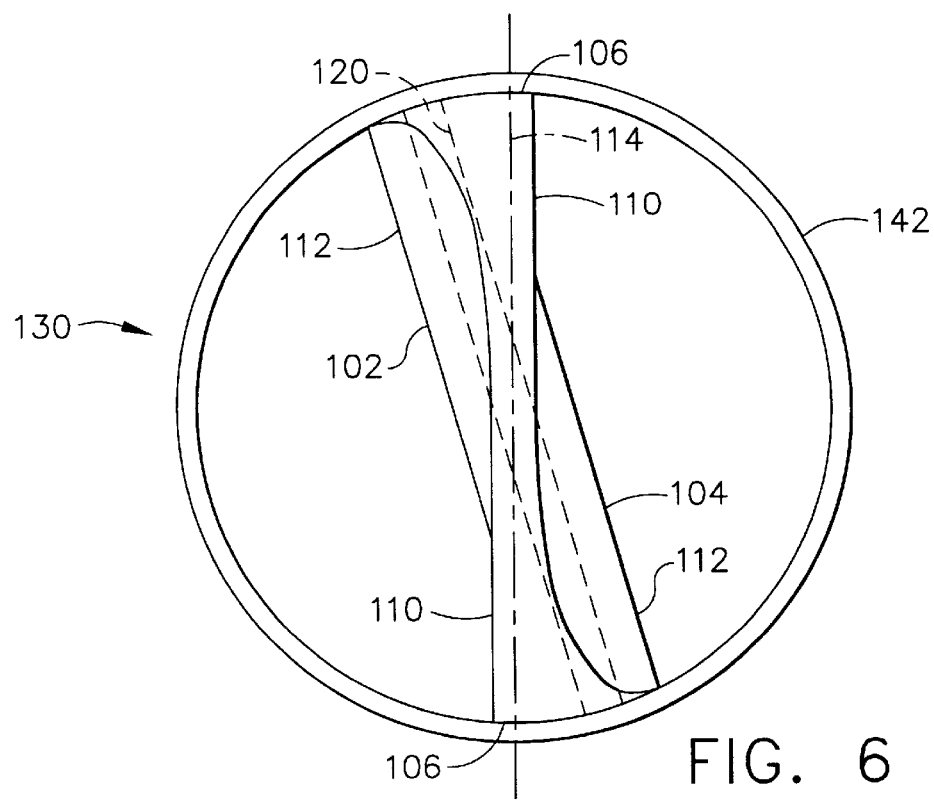
FIG. 6 is a front view of a butterfly valve assembly including the valve disk shown in FIG. 4.
Figure 7:
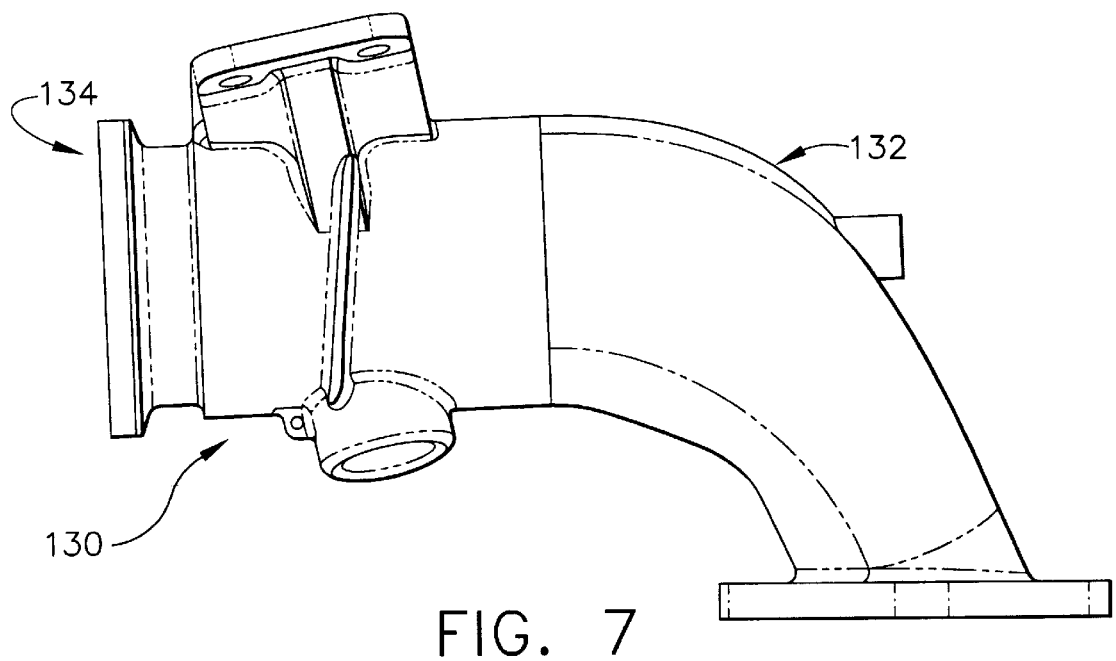
FIG. 7 is a side view of a known air supply pipe for use coupled to the butterfly valve assembly shown in FIG. 6.

FIG. 6 is a front view of a butterfly valve assembly 130 including valve disk 100. FIG. 7 is a side view of a known air supply pipe 132 for use with butterfly valve assembly 130. More specifically, butterfly valve assembly 130 is coupled to an outlet end 134 of pipe 132 and is used to regulate flow from pipe 132. In one embodiment, pipe 132 is an air supply pipe that is coupled to a gas turbine engine, such as engine 10 (shown in FIG. 1) and is used to supply airflow to a clearance control system that supplies cooling air into an engine casing (not shown) to control thermal growth of the engine casing to facilitate minimizing inadvertent blade tip rubbing.

Butterfly valve assembly 130 includes valve disk 100, a valve shaft 140 (shown in FIG. 4), and a valve body 142. Valve body 142 is coupled to supply pipe outlet end 134 such that valve body 142 is concentrically aligned with respect to supply pipe 132. Valve shaft 140 pivotally couples valve disk 100 to valve body 142.

When butterfly valve assembly 130 is in a fully-opened position, as shown in FIG. 6, valve disk 100 has a front cross-sectional blockage profile that obstructs a portion of the fluid path through valve body 142. A ratio of the interior cross-sectional area of valve body 142 to the valve disk front cross-sectional blockage profile is defined as an effective area of butterfly valve assembly 130. Because valve disk 100 includes tapered raised areas 112, an effective area of butterfly valve assembly 130 is facilitated to be improved over known valve assembly 50 (shown in FIG. 2). In one embodiment, butterfly valve assembly has an effective area that is approximately equal 2.10 in$^2$.

During use, as fluid flows towards butterfly valve assembly 130, the front cross-sectional blockage profile of valve disk 100 facilitates reducing total pressure losses associated with butterfly valve assembly 130 in comparison to other known butterfly valve assemblies, such as assembly 50. More specifically, in one embodiment, airflows through butterfly valve assembly 130 are channeled into pipe 132 with an air pressure that is approximately 0.13 psi greater than airflows exiting assembly 50 under the same operating conditions. In one embodiment, because the airflow is discharged from assembly 130 at a higher pressure into a clearance control system, assembly 130 facilitates improving an effectiveness of the clearance control system. A Furthermore, because disk raised areas 112 create a gradual inlet contraction and exit expansion, loss coefficients of the fluid passing through assembly 130 are facilitated to be reduced in comparison to those associated with assembly 50.

The above-described butterfly valve assembly is cost-effective and highly reliable. The butterfly valve assembly includes a valve disk including a contoured outer surface. The outer surface defines a blockage area that is smaller and as such, facilitates reducing total pressure losses of fluids flowing through the valve. Accordingly, the fluid is discharged from the butterfly valve assembly at a higher pressure.

While the invention has been described in terms of various specific embodiments, those skilled in the art will recognize that the invention can be practiced with modification within the spirit and scope of the claims.

What is claimed is:

1. A method for operating a gas turbine engine, said method comprising:

directing airflow into an air supply pipe through a butterfly valve assembly including a substantially circular valve disk that has opposed sides, an outer periphery, and an outer surface that extends over both sides and is continuously gradually tapered from the disk outer periphery to a centerline axis that extends through the valve disk; and channeling the air flowing through the air supply pipe to an engine clearance control system.

2. A method in accordance with claim 1 wherein directing airflow into an air supply pipe further comprises directing airflow through the butterfly valve assembly including a valve disk that facilitates reducing pressure losses to the airflow through the butterfly valve.

3. A method in accordance with claim 1 wherein directing airflow into an air supply pipe further comprises directing airflow through the butterfly valve assembly including a valve disk that facilitates increasing a valve effective area through said butterfly valve assembly.

4. A method in accordance with claim 1 wherein directing airflow into an air supply pipe further comprises directing airflow through the butterfly valve assembly including a valve disk having an outer surface that is contoured over both opposing disk sides.

5. A method in accordance with claim 1 wherein directing airflow into an air supply pipe further comprises directing airflow through the butterfly valve assembly including a valve disk having an outer surface that is tapered over approximately half of at least one of the opposing disk sides.

6. A butterfly valve comprising:

a valve shaft; and a substantially circular valve disk having a centerline axis extending through said valve disk, said valve disk comprising a shaft opening, an outer periphery, an outer surface, a first side, and a second side, said first side opposite said second side, said shaft opening defined within said valve disk and extending obliquely through said valve disk to intersect said centerline axis and sized to receive said shaft therein, said disk outer surface extending over said first and second sides, said outer surface continuously gradually tapered between said outer periphery and said centerline axis over at least one of said first side and said second side.

7. A butterfly valve in accordance with claim 6 wherein said disk outer surface tapered over said first and said second disk sides.

8. A butterfly valve in accordance with claim 6 wherein said disk outer surface defines a substantially parallelogram-shaped cross-sectional profile.

9. A butterfly valve in accordance with claim 6 wherein said valve disk configured to facilitate reducing pressure losses through said butterfly valve.

10. A butterfly valve in accordance with claim 6 wherein said valve disk configured to facilitate increasing a valve effective area of said butterfly valve.

11. A butterfly valve in accordance with claim 6 wherein said disk outer surface tapered over approximately half of said disk first side.

12. A butterfly valve in accordance with claim 6 wherein said disk outer surface tapered over approximately half of said second disk side.

13. A gas turbine engine clearance control system comprising:

an air supply pipe; and a butterfly valve configured to regulate an amount of airflow entering said air supply pipe, said butterfly valve comprising a valve shaft and a substantially circular valve disk, said valve disk having a centerline axis extending through said valve disk, said valve disk comprising an opening extending obliquely therethrough and defined therein, an outer periphery, an outer surface, and a pair of opposing sides, said opening intersecting said valve disk centerline axis, said shaft extending through said opening, said outer surface extending over said disk sides and continuously gradually tapered between said outer periphery and the centerline axis.

14. A clearance control system in accordance with claim 13 wherein said butterfly valve pair of opposing disk sides comprise a first side and a second side, said outer surface tapered over at least one of said disk first and second sides.

15. A clearance control system in accordance with claim 13 wherein said butterfly valve pair of opposing disk sides comprises a first side and a second side, said outer surface tapered over said disk first and second sides.

16. A clearance control system in accordance with claim 13 wherein said butterfly valve configured to facilitate reducing loss coefficients of airflow through said butterfly valve.

17. A clearance control system in accordance with claim 13 wherein said butterfly valve disk configured to facilitate increasing a valve effective area of said butterfly valve.

18. A clearance control system in accordance with claim 13 wherein said butterfly valve configured to facilitate increasing a total pressure of air flowing through said valve.

19. A clearance control system in accordance with claim 13 wherein said butterfly valve disk tapered over approximately half of at least one of said opposing sides.

20. A clearance control system in accordance with claim 13 wherein said butterfly valve disk tapered over approximately half of each of said opposing sides, said outer surface defining a substantially parallelogram-shaped cross sectional profile for said valve disk.

* * * * *